June 14, 1966  W. B. BLIX, JR., ETAL  3,255,709
METHOD AND MEANS FOR TRACK LINING
Filed Feb. 16, 1961  5 Sheets-Sheet 3
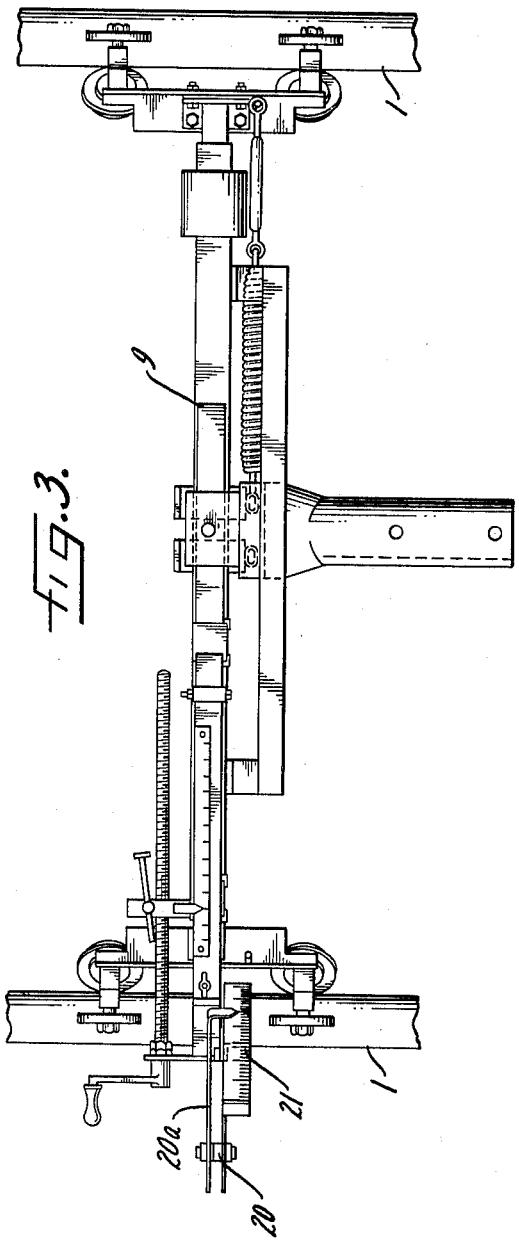
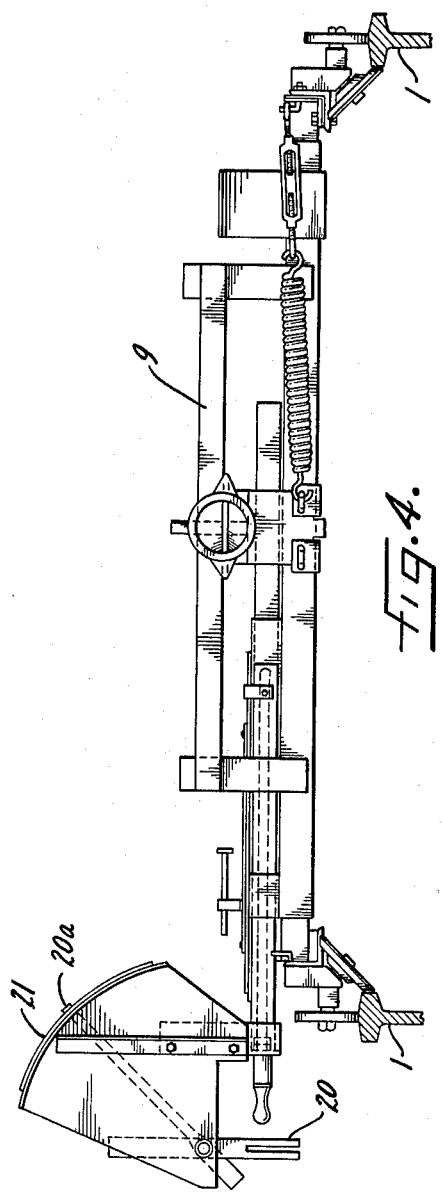
INVENTORS.
WELTZIN B. BLIX, JR.
JOHN L. HOLMAN
JOHN R. RUSHMER
BY *Parker & Carter*
ATTORNEYS.

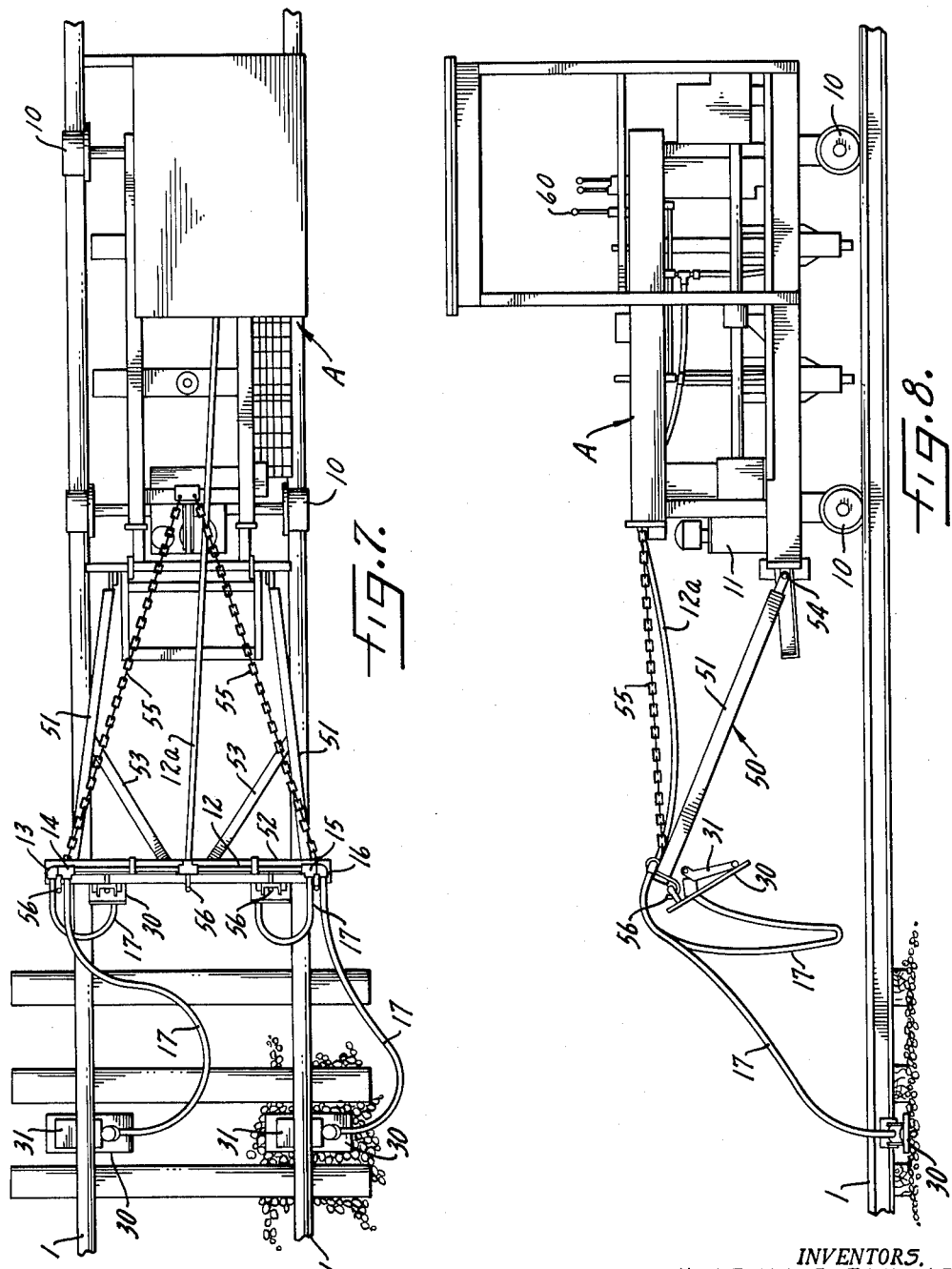

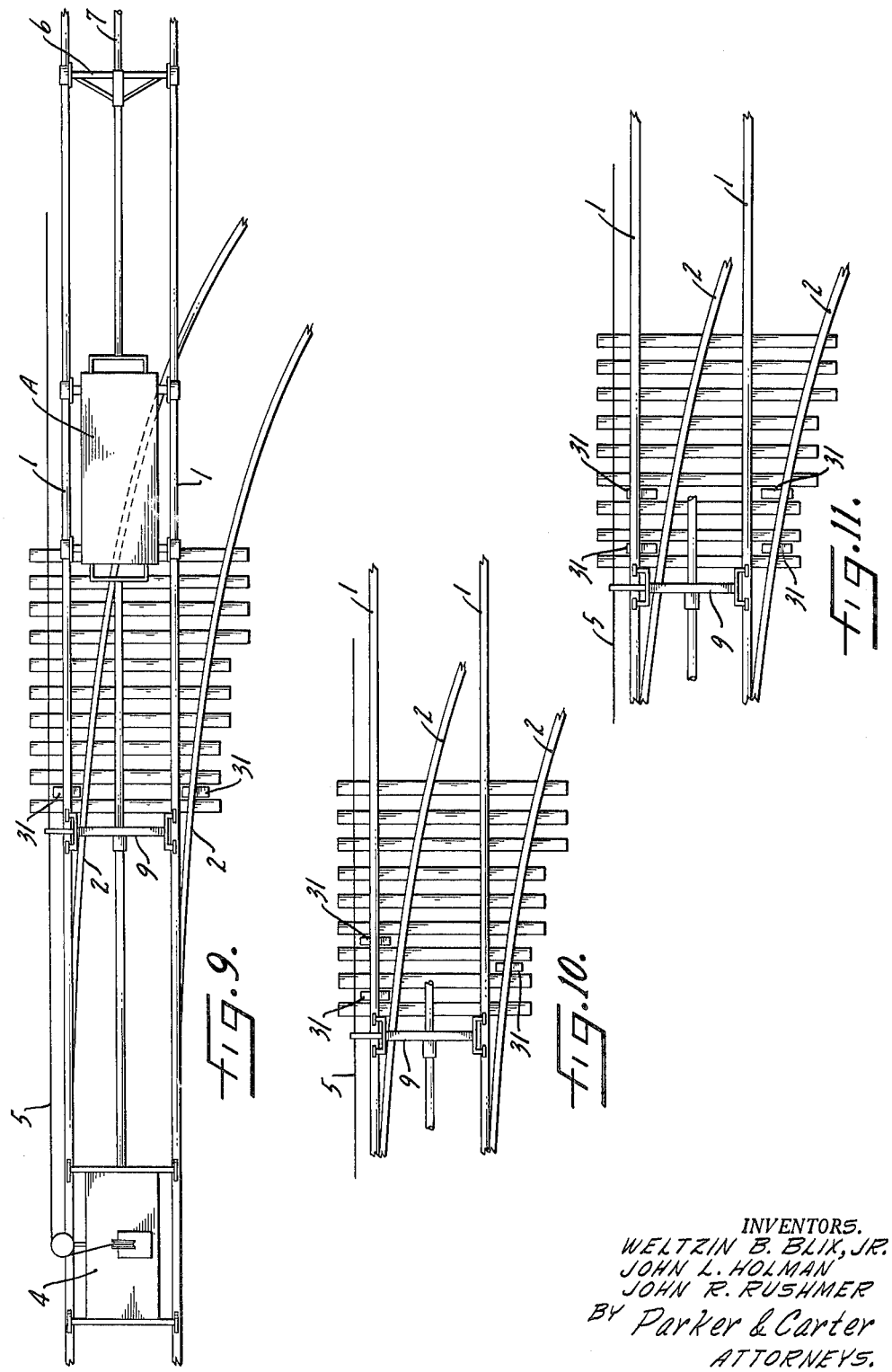

United States Patent Office 3,255,709
Patented June 14, 1966

3,255,709
METHOD AND MEANS FOR TRACK LINING
Weltzin B. Blix, Jr., South Milwaukee, John L. Holman, Hales Corners, and John R. Rushmer, Milwaukee, Wis., assignors to Nordberg Manufacturing Company, Milwaukee, Wis., a corporation of Wisconsin
Filed Feb. 16, 1961, Ser. No. 89,732
7 Claims. (Cl. 104—8)

The invention relates to an improvement in means of and methods for track lining, and, while it is shown as applied to the lining of switches, frogs, or other track components other than simple rails, it may be used also in lining any track rail.

One purpose is to provide a means of and method for shifting switches into a predetermined alignment or position.

Another purpose is to provide a means of and method for shifting switches, frogs, and the like, into a predetermined alignment or position in relation to a maintained guiding line, wire or beam, when track is being aligned.

Another purpose is to provide a mechanism of maximum flexibility for local aligning of track parts.

Another purpose is to provide a track lining means and method adapted for use in rail in congested areas.

Another purpose is to provide an improved method of local track lining or track or rail shifting.

Other purposes will appear from time to time in the course of the specification and claims.

The invention is illustrated diagrammatically in the accompanying drawings, wherein:

FIGURE 3 is a plan view of one of the components illustrated in FIGURE 2;

FIGURE 4 is a side elevation, in a transverse vertical plane, of the structure of FIGURE 3, the rails being illustrated in vertical transverse section;

FIGURE 5 is a side elevation of a rail shifting element employed in the invention;

FIGURE 6 is a plan view of the structure shown in FIGURE 5;

FIGURE 7 is a diagrammatic plan view of the general structure shown in FIGURE 2;

FIGURE 8 is a diagrammatic side elevation of the structure of FIGURE 7; and

FIGURES 9, 10 and 11 are diagrammatic plan views of a track and switch illustrating various applications of force employable with our method or apparatus.

Like parts are indicated by like symbols throughout the specification and drawings.

Figure 1:
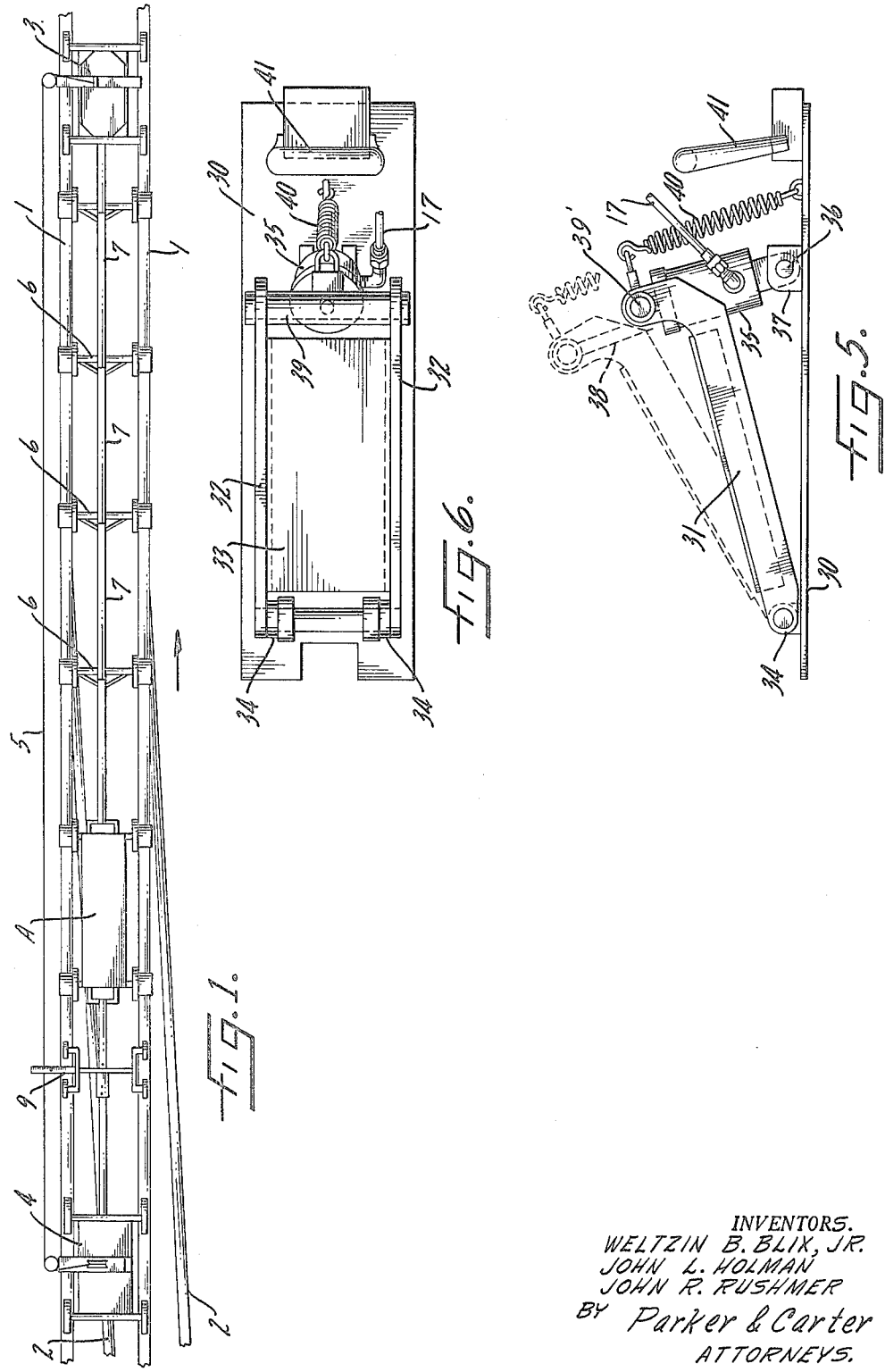
FIGURE 1 is a diagrammatic plan view of a track lining assembly with which the present invention may be employed.

Our invention is illustrated as practiced by a track shifting assembly, including a track shifting mechanism and a wire used to provide a datum line for the track shifting. It will be understood, however, that this is a matter of illustration and not of limitation, as the invention may be carried out with a variety of equipment. Referring to the drawings, and, first, to FIGURE 1. 1 indicates diagrammatically the rails of a track. Additional rails 2 are connected to the rails 1 by a switch structure, not indicated in detail. In the particular mechanism diagrammed in FIGURE 1, a forward buggy 3 and a rear buggy 4 are suitably mounted to ride along the rails of the track. They are shown as connected by a tensioned wire 5. The buggies 3 and 4 are suitably spaced apart to provide a predetermined length of the wire 5, which may, for example, be of the order of 120 feet. Whereas we describe and show a wire 5, it will be realized that any other means for maintaining a line of reference may be obtained. For example, a beam of light may be employed, or the line of reference may be defined by other means, or may be determined by optical observation. In the structure diagrammed in FIGURE 1, the buggies 3 and 4 are spaced apart by a plurality of individual buggies 6 connected by a sequence of spacer bars 7. Interposed in the series of buggies is illustrated a piece of track working equipment, generally indicated at A, which may, for example, be a means for laterally shifting the track. 9 diagrammatically indicates a buggy provided with a suitable sensing means for determining the relation of the track or rails to the wire 5 or an equivalent line of reference.

Figure 2:
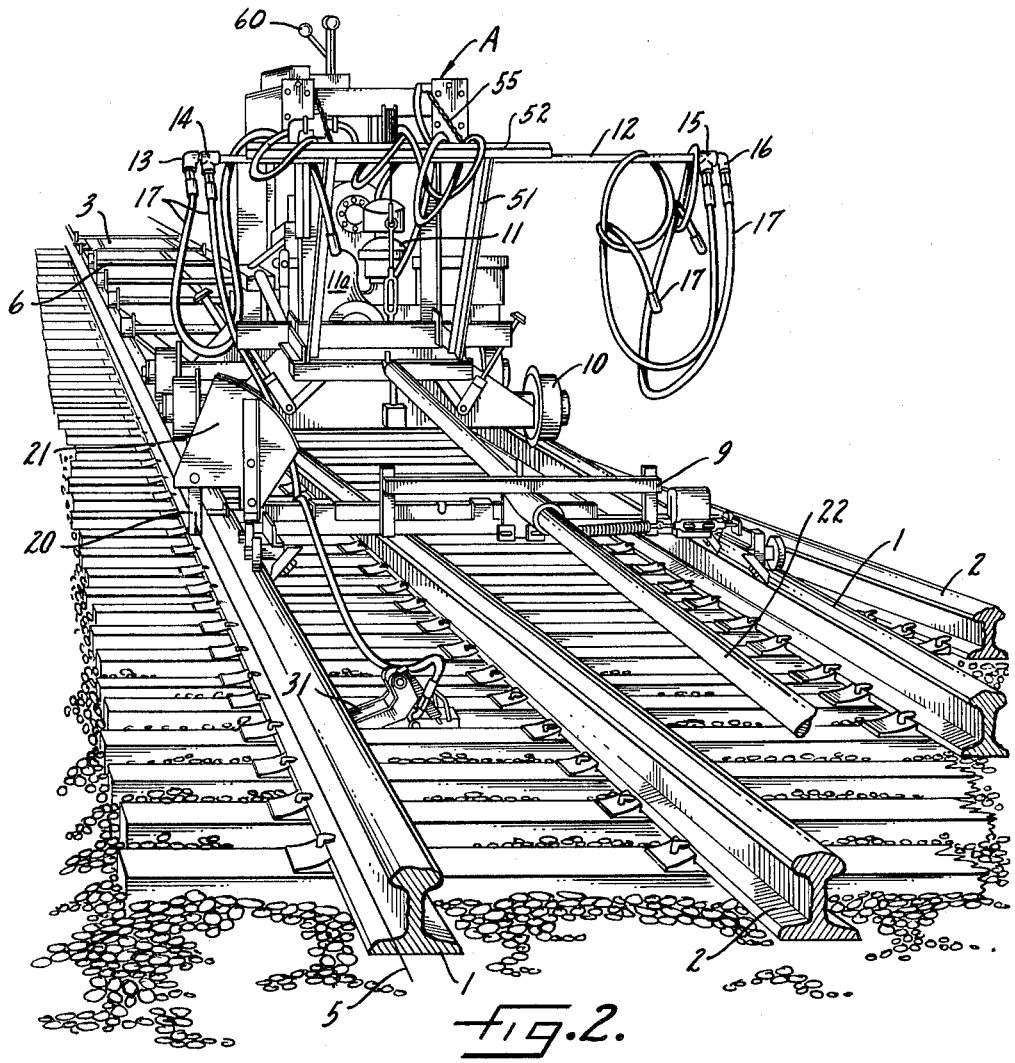
FIGURE 2 is a perspective view of some of the components of such an assembly.

Whereas the details of the equipment employed are not, of themselves, essential, we illustrate, in FIGURE 2, a piece of track shifting equipment, generally indicated as A. It is shown as mounted on flanged wheels 10, whereby it and the rest of the assembly shown in FIGURE 1 are guided for movement along the rails of the track. The details of the unit A do not, of themselves, relate to the present invention. It will be understood, however, that the unit includes motor means, such as the motor 11, and any suitable compressor or other means for maintaining a predetermined pressure in a fluid pressure system. As a matter of convenience, the unit A may be constituted by a track liner such as is shown in Patent No. 2,926,616, issued by the United States Patent Office on March 1, 1960, in the name of Henry H. Talboys. However, in the practice of our invention the unit A is relied upon primarily as an available source of fluid pressure, preferably of hydraulic pressure. 12 indicates a manifold or pipe which is suitably connected to a compressor 11a by a flexible tube 12a shown in FIGURE 8. It is shown as having multiple outlets. In the particular structure of FIGURE 2 four are indicated, the outlet connections being shown in pairs at each end of the pipe 12, as at 13, 14 and 15, 16. Connected to each outlet is a flexible pipe or tube 17. It will thus be clear that in response to the operation of the compressor 11a by the motor 11 liquid pressure may be supplied through the pipes 17 simultaneously to four points. It will be understood, of course, that if a lesser number of applications is needed suitable closure means may be provided.

It will be understood that the unit A may be perfectly satisfactory for normal track shifting. However, such equipment is not adapted to operate in areas or on track lengths where frogs, switches, and the like, are present. For convenience, we will discuss the invention as it applies to straightening or aligning track at switch areas.

In the normal use of the unit A the sensing buggy 9 underlies the unit and rides along the rails at or beneath it. The unit 9 is illustrated in somewhat greater detail in FIGURES 3 and 4, but all that we need consider is the fact that it provides a sensing device, for example, the split feeler part 20 which embraces the wire 5, and which moves a suitable indicator 20a in relation to a viewing or calibrated part or segment 21. When a track team reaches a switch area where the unit A cannot be employed, the sensing buggy 9 and the unit A are separated. For example, an intermediate buggy 6, not herein shown, may be removed and the unit A positioned in its place. A supplemental spacing bar 22 extends from the sensing buggy 9 to the rear buggy 4. The sensing buggy thus stays at its normal position in relation to the length of the wire 5, but the unit A is removed from its normal position and placed somewhat in advance of the sensing buggy 9, as shown in FIGURE 1. It will be understood that the direction of movement along the track is as illustrated by the arrow in FIGURE 1, and there is therefore no change made in relation to the sensing buggy 9 and the front and rear buggies 3 and 4. To sum up, when the track lining assembly reaches a switch or other track length where the unit A cannot operate, the unit A is moved out of its normal position and remains in the line or sequence indicated in FIGURE 1 only as a power source, not as a track shifting means. We will now consider the actual application of power to the track.

Illustrated in FIGURES 5 and 6 is a track or rail or switch lining or shifting unit which may advantageously be used, when powered by the unit A, as a source of hydraulic pressure, to move track bodily laterally in relation to the right-of-way. 30 indicates a base which may be positioned upon the ballast or surface of the right-of-way in an intertie space. 31 is a lifting and shifting lever or jack structure, including side bars 32 and an intermediate plate 33. It is pivoted as at 34 to the base 30. The normal or initial position of the lever structure is illustrated in full line in FIGURE 5. 35 illustrates a hydraulic ram, including a cylinder and a piston movable in it. This ram is pivoted, as at 36, to ears 37 upwardly extending from the base 30. A piston rod 38 is fastened at its upper end to any suitable transverse connection 39 which is pivoted to the lever structure 31 at 39'. When liquid pressure is supplied to the interior of the ram the piston rod 38, and, thus, the lever structure, is elevated, for example, to the dotted line position of FIGURE 5. If a single-acting fluid system is employed it is advantageous to employ a returning spring 40 for returning the parts to the initial full-line position of FIGURE 5 when no pressure is being supplied. 41 is any suitable lifting handle on the base 30. 17 indicates a fluid pipe or connection which may, for example, be a flexible pipe from the manifold 12 and which extends to the ram 35 at a point below its piston component, whereby, when the pipe 17 is connected to a suitable source of liquid pressure, the lever is elevated to the dotted-line position. Whereas a flexible pipe is a convenient means of supplying and applying fluid pressure, other suitable means may be employed. The details of the jack structure may be widely varied. The base plate may have its lower face corrugated or provided with any suitable elements or deformations to prevent undesired lateral movement. Upwardly extending ribs or walls may be employed with the base plate to limit the penetration of loose stone beneath the lifting lever 31. The lever elements thus described may be used in any suitable number. Normally, four is adequate, and even smaller numbers may be employed. Thus, in FIGURE 9, two of the units are illustrated, one applied to one of the rails 1 and the other applied to one of the switch rails 2. Preferably, they are applied to the track at a point close to the sensing buggy 9, that being their position, as shown in FIGURE 9. As a matter of convenience, the unit A, as illustrated in FIGURES 7 and 8, has secured to it an A-frame, generally indicated as 50, and including side bars 51 and an end bar 52, with intermediate braces 53. This A-frame is pivoted as at 54 to the track liner unit, generally indicated as A, and may be held at any desired elevation, for example, by a flexible member or chain 55. The end bar or transverse member 52 may have carrying elements or hooks 56 to which the individual track shifting units of FIGURES 5 and 6 may be secured when not in use. The manifold or transverse pipe 12 may advantageously be mounted on or extend along the A-frame element 52, as shown, for example, in FIGURE 7. The individual switch lining units of FIGURES 5 and 6 are secured to this manifold, as above mentioned, by flexible conduits which may be connected to the manifold 12 by any suitable quickly disconnecting couplings, the details of which are not of themselves important.

Assume that the operator positions two of the switch lining units, as shown in FIGURES 7, with the levers 31 underlying the rails, then, when liquid pressure is supplied to the rams 35 of the two units, and the levers are moved from the full-line to the dotted-line position of FIGURE 5, the rails are not merely lifted, they are also moved laterally. When hydraulic pressure is released the rails, and, of course, the whole track, since the rails are connected to the ties, are released to move downwardly toward the ballast. A repetition of as many lifting movements as is necessary results in a lateral shift of the track in the facing direction of the switch lining units. If the sensing device indicates an over-correction, the units may be reversed, and will, of course, move the track in an opposite direction. In any event, our method includes maintaining or determining a line of reference, maintaining or determining the relationship between the track and the line of reference, and moving the track laterally until a predetermined relation is obtained between the track and the line of reference. As a matter of convenience, we find it advantageous to employ the wire 5 shown herein; but we do not limit our method to the employment of such a wire. Any suitable means of or method for determining the relationship of the track to a predetermined norm or line may be employed, to the end that the track, with its switch, will be moved to a desired position.

In practice it may be important to push the rail shifting units or jacks farther under the base of the rail for each successive lift and thrust. This is necessary because the pressure causes the rail shifting unit to sink into the ballast and thus uses up the effective motion. Under some circumstances it may be necessary to limit the lift of the track to a predetermined height to prevent ballast rolling under the ties and humping the track structure. It is, of course, necessary that all the shifter units work simultaneously.

Since the switch lining units are relatively small, and can easily be manually handled and shifted, and are not rigidly connected to each other or to any equipment, there is complete flexibility in their use. FIGURE 9 illustrates the use of two of the switch lining units, one of them being applied to one of the rails 1 and one of them to one of the rails 2. FIGURE 11 illustrates the use of four of the switch lining units, and FIGURE 10 illustrates the use of three. It will be understood, of course, that the operators may arrange the switch lining units in any way they wish, and in any number they wish, in relation to one or both of the rails 1 or one or both of the rails 2. Since, in the use of our invention, the rails are all connected together by the ties, the track assembly, in any event, is moved laterally as a unit.

An advantage of our mechanism is the complete flexibility given to the operators in applying force to one or more rails at any desired or suitable point, or points. The flexible pipes or tubes 17 will be used simultaneously to connect all of the switch lining units employed. The pipe 12 serves as a manifold, and the hydraulic pressure is supplied simultaneously to all of the units which are connected to the manifold. The flexibility of the pipes 17 gives full liberty to the users to arrange and place the individual switch lining units as they wish.

Without going into the details of the unit A, which is thought to be unnecessary, it will be understood that any suitable control means may be provided for controlling the application of the fluid pressure. For example, when the desired number of switch lining units has been positioned beneath and against the rails the operator, by moving a suitable control lever, such as is diagrammatically shown at 60 in FIGURE 2, may apply pressure simultaneously to all of the units, and may, of course, terminate the application of pressure at will. Another operator, or other operators, may, where necessary, advance the switch lining units forwardly beneath the appropriate rails as the track, as a whole, is shifted.

It will be realized that, whereas we have described and illustrated a practical and operative device, nevertheless many changes may be made in the size, shape, number and disposition of parts without departing from the spirit of our invention. It will be realized, for example, that any suitable means may be employed to maintain or to determine the line of reference toward or in relation to which the track is to be moved. Any suitable means of supplying liquid pressure to the switch lining units may be employed, but it is convenient, as in the above described instance, to employ a piece of equipment, such as a track shifter, which is already available. We therefore wish our description and drawings to be taken as in a broad sense illustrative or diagrammatic, rather than as limiting us to our precise showing.

We claim:

1. In a switch lining mechanism for railroad tracks, a source of hydraulic pressure, a track working assembly mounted for movement along the rails of a track, means associated therewith for maintaining a predetermined datum line to which the track may be adjusted, and means for shifting the track in relation to said line, said means including a plurality of individual rail engaging elements, each of said rail engaging elements being independently movable and connected to said source of hydraulic pressure for simultaneous operation but being operable at various points spaced away from the mounted assembly.

2. The structure of claim 1, characterized by and including means for supporting said independently movable rail engaging elements upon the trackworking assembly when they are not in use.

3. The structure of claim 1, characterized by and including a manifold intermediate the independently movable rail engaging elements and the source of hydraulic pressure, said manifold having a plurality of outlets, and means for connecting individual outlets with each of the independently movable rail engaging elements.

4. The structure of claim 3, further characterized by a movable supporting frame on said track-working assembly, said manifold being mounted thereon, there being means for positioning said frame at a plurality of positions.

5. A method of lining railroad track and track in turnout switches and the like by the use of an assembly which includes a power operated track lining instrument adapted to shift track at multiple points which may be differently positioned and means for establishing a datum line of predetermined length along the track, including the steps of moving the assembly with the power instrument therein along the track in steps while sensing the lateral relation of the track to the datum line from time to time at a sensing station at the power instrument and shifting the track laterally to bring it to a predetermined relation to the datum line as variations are detected in the sensing step, keeping the power instrument, sensing station and datum line in their same relative longitudinal relation, changing the position of the power instrument in a longitudinal direction in the assembly when the assembly encounters a turnout switch in the track, but leaving the sensing station in the same longitudinal relationship to the other components in the assembly, moving the assembly and the datum line established thereby through the turnout switch and sensing the relationship of the rails to the datum line from time to time, and using the power from the power instrument to shift the track laterally in the turnout switch at a point selected independently of the position of the power instrument to bring the rails to the predetermined relation to the datum line where variations are detected.

6. In a switch lining mechanism for railroad tracks and the like, a source of hydraulic pressure, a track working assembly mounted for movement along the rails of a track, means associated therewith for maintaining a predetermined line to which the track may be adjusted, a plurality of individual rail engaging elements, said rail engaging elements being independently movable and connected to said source of hydraulic pressure by flexible conduits for simultaneous operation but being operable at various points away from the mounted assembly, and said rail engaging elements including a base, a lever pivoted at one end of said base, each of said elements formed and adapted to be inserted with said base beneath the rail of a track, a hydraulic ram positioned between the base and the other free end of the lever, and said hydraulic source supplying liquid pressure via the flexible conduits to operate said hydraulic ram.

7. A method of adjusting railroad track in turnouts, switches, and the like by the use of an assembly which includes a power operated instrument with a source of hydraulic pressure, adapted to adjust track at multiple points which may be differently positioned and means for establishing a datum line of predetermined length along the track, including the steps of moving the assembly with the power instrument therein along the track in steps while adjusting the relation of the track to the datum line from time to time at a sensing station at the source of hydraulic pressure and adjusting the track to bring it to a predetermined relation to the datum line when variations are detected at the sensing station, keeping the source of hydraulic pressure, sensing station and datum line in their relative longitudinal relations while the assembly is being so moved and sensing is taking place, moving the assembly and the datum line established thereby through a turnout, switch or the like in the track when such a turnout or switch is encountered, and, at the same time, sensing the relationship of the rails to the datum line from time to time while moving through the turnout or switch, and using the source of hydraulic pressure to shift the track laterally in the turnout or switch at a point selected independently of the position of the source of hydraulic pressure to bring the rails to the predetermined relation to the datum line when variations are detected in the turnout or switch.

References Cited by the Examiner

UNITED STATES PATENTS

| | | | |
|---|---|---|---|
| 1,534,417 | 4/1925 | Sinning | 254—44 |
| 1,672,898 | 6/1928 | McClellan | 254—43 |
| 1,826,756 | 10/1931 | Falkner | 254—44 |
| 2,143,611 | 1/1939 | Nijenhuis | 254—44 |
| 2,567,335 | 9/1951 | Hebert | 254—124 |
| 2,621,892 | 12/1952 | Kilness | 254—124 |
| 2,887,296 | 5/1959 | Geier | 254—43 |
| 2,918,100 | 12/1959 | Knox et al. | 72—403 |
| 2,926,616 | 3/1960 | Talboys | 104—7 |
| 2,966,123 | 12/1960 | Talboys | 104—8 |
| 3,050,015 | 8/1962 | Talboys | 104—2 |

ARTHUR L. LA POINT, *Primary Examiner.*

JAMES S. SHANK, LEO QUACKENBUSH, *Examiners.*

D. R. MOTSKO, M. J. HILL, R. A. BERTSCH,
*Assistant Examiners.*